(12) United States Patent
Routt

(10) Patent No.: US 6,671,993 B1
(45) Date of Patent: Jan. 6, 2004

(54) FLY LINE EXCHANGE APPARATUS AND METHOD

(76) Inventor: Thomas P. Routt, P.O. Box 1663, Duvall, WA (US) 98019

(*) Notice: Subject to any disclaimer, the term of this patent is extended or adjusted under 35 U.S.C. 154(b) by 70 days.

(21) Appl. No.: 09/629,937

(22) Filed: Aug. 1, 2000

(51) Int. Cl.[7] .......................... A01K 97/00; A01K 89/00
(52) U.S. Cl. ...................................... 43/4.5; 43/4; 43/25
(58) Field of Search ....................... 43/4, 4.5, 25, 44.98; 24/908; 242/129.8, 902

(56) References Cited

U.S. PATENT DOCUMENTS

| | | | |
|---|---|---|---|
| 1,971,000 A | * 8/1934 | Field | 43/25 |
| 2,712,196 A | * 7/1955 | Allen | 43/44.98 |
| 2,848,778 A | * 8/1958 | Plummer | 43/25 |
| 3,973,741 A | 8/1976 | Dean | 242/84.1 |
| 4,151,966 A | 5/1979 | Lindsay | 242/106 |
| 4,720,056 A | 1/1988 | Danielsson | 242/84 |
| 4,819,305 A | * 4/1989 | Ooe | 24/908 |
| 5,029,409 A | 7/1991 | Nouwens | 43/25 |
| 5,218,779 A | 6/1993 | Morgan et al. | 43/25 |
| 5,375,788 A | 12/1994 | English | 242/129 |
| 5,513,463 A | 5/1996 | Drinkwater | 43/25 |
| 5,855,085 A | 1/1999 | Jinks, Jr. | 43/20 |

* cited by examiner

Primary Examiner—Kurt Rowan
(74) Attorney, Agent, or Firm—Dean A. Craine

(57) ABSTRACT

A fly line exchange apparatus and method including a temporary reel that houses a relatively short pull line that temporarily attaches to the end of the existing fly line. During use, the end of the pull line is connected via a quick connector to the end of the fly line. When the main fishing reel on the fishing pole is rotated, the fly line and pull line are pulled together through the eyelets on the fishing rod. When the end of the pull line is pulled through the eyelet closest to the reel, the old fly line is detached from the quick connector. The old spool in the reel is then replaced with a new spool having the desired fly line. The end of the new fly line is attached to the quick connector on the end of the pull line and the temporary reel is rotated to pull the pull line and new fishing line through the last eyelet on the fishing rod. The pull line is then detached from the new fishing line so that the new fishing line may be used.

8 Claims, 3 Drawing Sheets

FLY LINE EXCHANGE APPARATUS AND METHOD

BACKGROUND OF THE INVENTION

1. Field of the Invention

The present invention relates to fishing line replacement devices, and, more particularly, to such devices used by fly-fishermen while fishing.

2. Description of the Related Art

Fly-fishermen often use different fishing lines that they exchange while fishing. Current methods for changing fishing lines require the fishing line to be rewound onto the spool in the reel and then the spool is replaced with a spool of new fishing line. The new fishing line must then be manually threaded through the eyelets located on the fly rod. In many instances, all of these acts are carried out while standing in the river or while floating in the middle of a lake.

What is needed is a lightweight, portable apparatus and method that allows a fly-fishermen fishermen to easily and quickly change the fishing line.

All that the fly-fisherman would need to do is attach the pull line to his current fly line with the quick connector, reel the current fly line with the attached pull line to the spool, disconnect the quick connector and put a new line onto the reel, attach the end of the new line to the quick connector, which is still connected to the pull line, and finally, rewind the pull line on its spool and then disconnect the end of the new fly line from the quick connector.

SUMMARY OF THE INVENTION

It is an object of the present invention to provide a lightweight, portable apparatus and method that allows a fly-fisherman to easily change his or her fly lines while wading or floating in water.

It is another object of the present invention to provide such an apparatus and method that does not require the fisherman to manually thread the new fly line through the individual eyelets.

These and other objects of the present invention are met by a fly line exchange apparatus that includes a temporary reel that contains a spool with a relatively short pull line capable of temporarily attaching to the end of the existing fly line. During use, the reel is temporarily attached to the fishing rod and the distal end of the pull line is connected via a quick connector to the end of the existing fly line extending from the end of the fishing rod. When the main fly reel is rotated to wind the existing fly line thereon, both the fly line and pull line are pulled backward together through the eyelets on the fishing rod. When the distal end of the pull line is pulled through the eyelet closest to the main fly reel, the end of the existing fly line is detached from the quick connector. The spool in the fly reel is then replaced with the desired new spool of fly line. The end of the new fly line is then attached to the quick connector on the pull line. The temporary reel is then rotated to rewind the pull line, and to pull the new fly line back through the eyelets. When the end of the new fly line has been pulled through the last guide or eyelet, the quick connector is then detached from the end of the new fly line and the temporary reel can be removed from the pole. The quick connector is designed to easily allow the user to connect the fly lines to the pull line.

DESCRIPTION OF THE PREFERRED EMBODIMENT(S)

Figure 1:
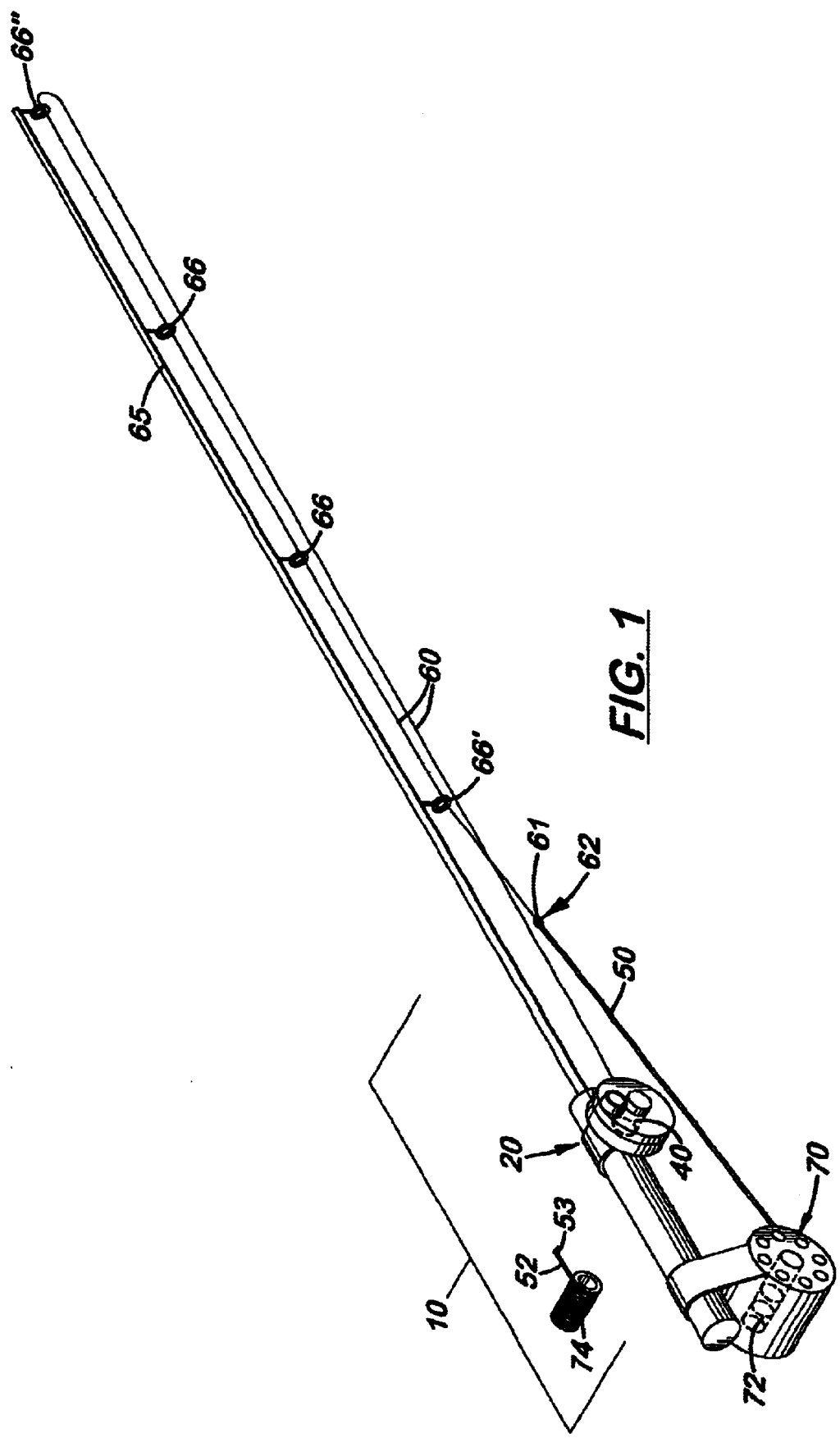
FIG. 1 is a perspective view of the fishing line exchange apparatus shown attached to a standard fly rod.

There is shown in the accompanying FIGS. 1–5 a fly line exchange apparatus 10 that assists a fisherman to exchange a spool 72 of fly line on a fly rod 65. The apparatus 10 includes a temporary reel 20 with a spool 40 having a relatively short pull line 60 wound thereon capable of temporarily attaching to the end of the existing fly line 50 extending from the end of the fly rod 65. During use, the distal end 61 of the pull line 60 is connected via a quick connector 62 to the end of the existing fly line 50. When the main fly reel 70 is rotated to rewind the existing fly line 50 thereon, the existing fly line 50 and pull line 60 are pulled together through the eyelets 66, 66', 66" on the fly rod 65. When the distal end 61 of the pull line 60 is pulled through the eyelet 66' closest to the main fly reel 70, the end of the existing fly line 50 is detached from the quick connector 62. The spool 72 in the reel 70 is then replaced with the desired new spool 74 onto which the new fly line 52 has been wound thereon. The end 53 of the new fly line 52 is then attached to the quick connector 62. The temporary reel 20 is then rotated to rewind the pull line 60 thereon, and to pull the new fly line 52 through the eyelets 66, 66', 66" on the fly rod 65. When the distal end 53 of the new fishing line 52 has been pulled through the last eyelet 66", the distal end 53 of the new fly line 52 is then detached from the quick connector 62.

Figures 2, 5:
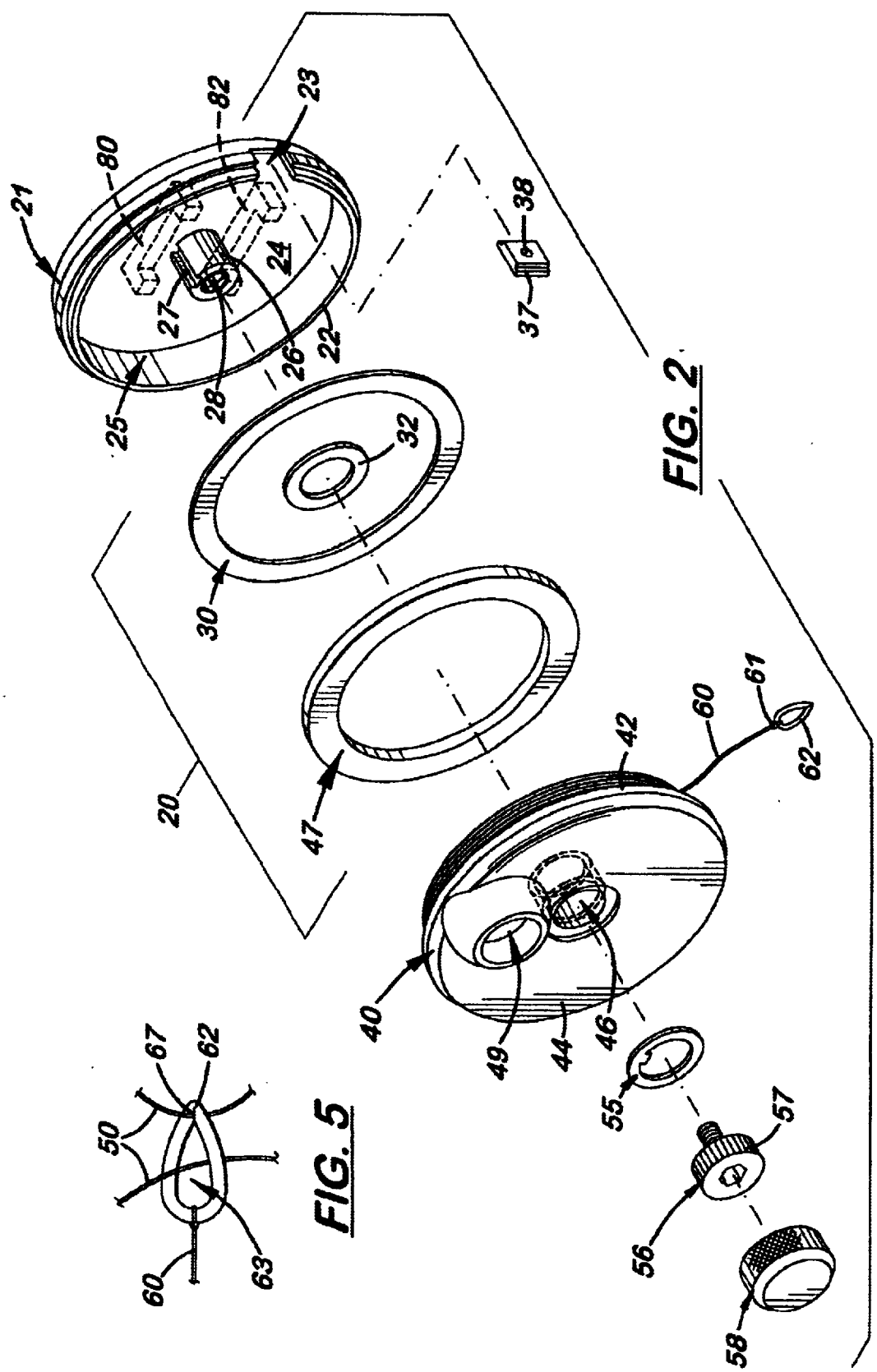
FIG. 2 is an exploded, perspective view of the temporary reel.
FIG. 5 is a right side elevation view of the quick connector.
Figure 4:
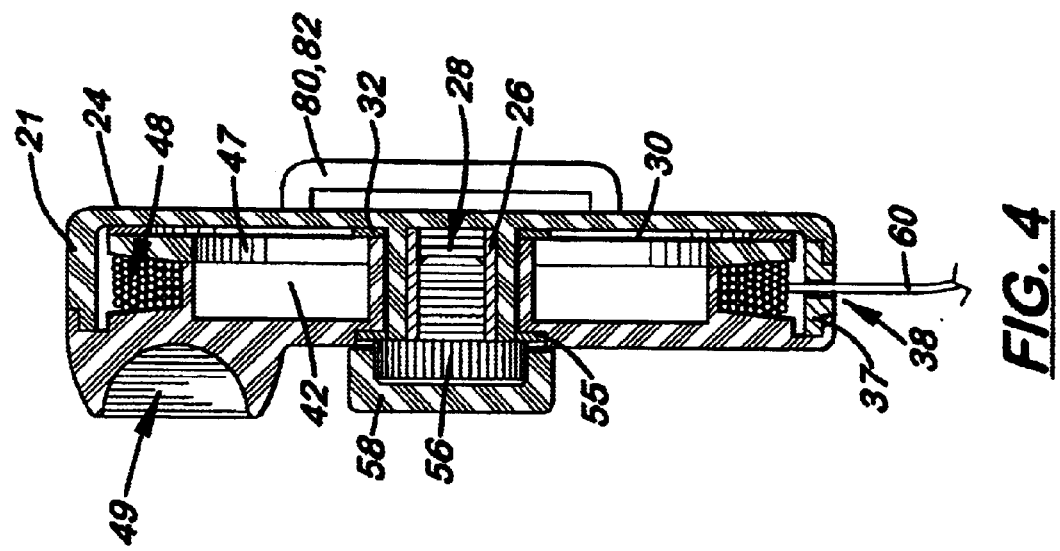
FIG. 4 is a sectional, side elevation view of the invention shown in FIG. 3.
Figure 3:
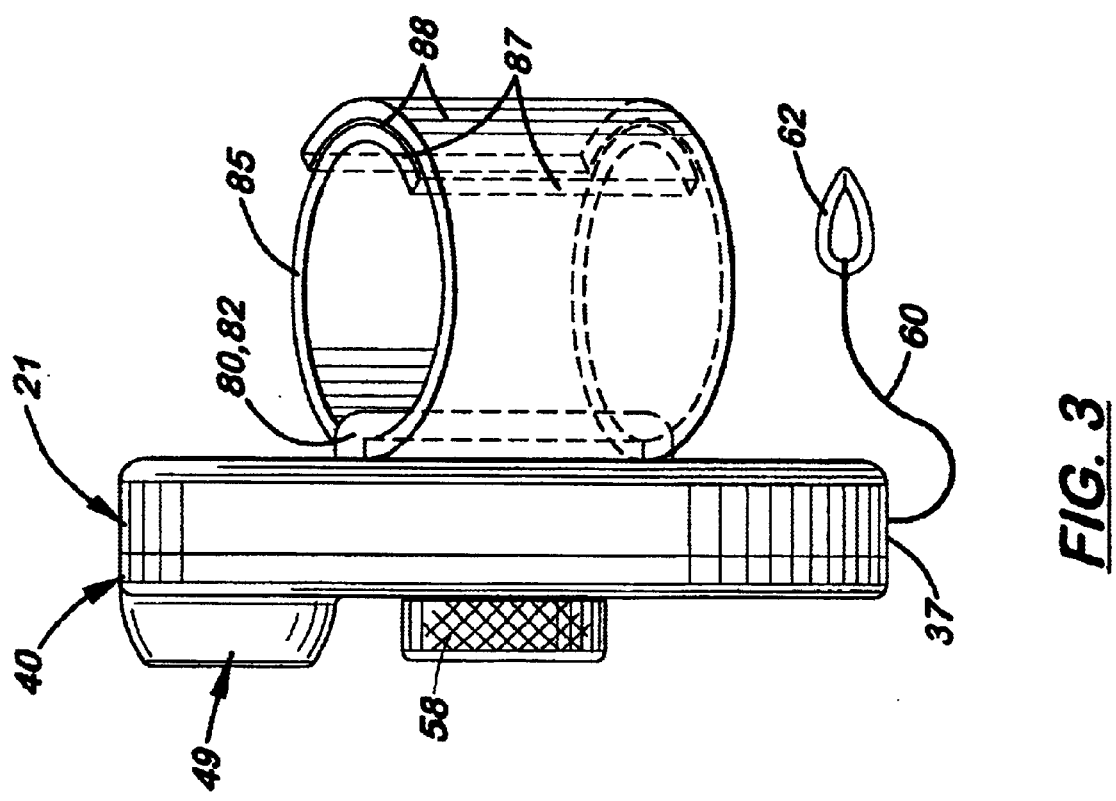
FIG. 3 is a side elevation view of the temporary reel attached to the user's belt.

FIGS. 2–4 are detailed drawings of the temporary reel 20 disclosing a narrow cylindrical-shaped main housing 21 and a narrow, circular spool member 40 that fits over the outer opening 25 of the main housing 21. The main housing 21 is cylindrical-shaped with a flat back wall 24 and outer perpendicular-aligned surrounding walls 22. Formed centrally on the inside surface of the back wall 24 is a perpendicularly aligned neck 26. Formed centrally inside the neck 26 is a longitudinally aligned threaded bore 28. Formed on the outside surface of the neck 26 is a longitudinally aligned slot 27. Formed on the forward side wall 22 is a square-shaped cutout 23 designed to receive a line guide 37 that, during assembly, slides into the cutout 23. A bore 38 is formed in the line guide 37 through which the pull line 60 extends.

As stated above, disposed over the main opening 25 of the main housing 21 is a spool member 40. The spool member 40 includes a circular front plate 44 and a smaller diameter, perpendicularly aligned, cylindrical axle 42 that extends into the main opening 25 during assembly. Formed centrally through the axle 42 is a central bore 46. The bore 46 includes a wider recessed opening on the outer surface of the front plate 44. During assembly, a slotted washer 55 and a threaded bolt 56 are extended into the bore 46 and positioned inside the recessed opening. During assembly, the bolt 56 is connected to the threaded bore 28 on the neck 26 of the main housing 21 to hold the spool member 40 on the main housing 21. The slotted washer 55 remains stationary on the neck 26 and allows the spool member 40 to rotate around the threaded bolt 56. An outer finger slot 49 is formed on the outer surface of the front plate 44, which the user uses to rotate the front plate 44. An outer cap 58 may be placed around the head 57 of the bolt 56 to allow the bolt 56 to be easily turned.

Securely attached or integrally formed on the rear edge of the cylindrical axle 42 is a circular back plate 47. The back plate 47 is aligned parallel and spaced apart from the front plate 44 thereby creating a space 48 on the axle 42 upon which the pull line 60 may be wound, as more clearly shown in FIG. 4.

Disposed adjacent to the inside surface of the back wall 24 and around the neck 26 is a large washer 30. Disposed adjacent to the inside surface of the back wall 24, inside the large washer 30 and around the neck 26 is a small washer 32. During use, the larger washer 30 and small washer 32 reduce friction so that the spool member 40 may rotate freely inside the main housing 21.

Wound around the axle 42 is a relatively short pull line 60. The proximal end (not shown) of the pull line 60 is securely attached to the surface on the axle 42. The distal end 61 of the pull line 60 extends through the line guide 37 to the quick connector 62, shown more clearly in FIG. 5. In the preferred embodiment, the pull line 60 is approximately 18 feet in length.

Attached to the distal end 61 of the pull line 60 is a connection means for connecting the ends of the pull line 60 to the fly lines. In the preferred embodiment, the connection means is a oval-shaped slotted-ring quick connector 62 with a partially extending slot 67 formed thereon designed to allow the user to quickly attach the end of the existing fly line 50 or the new fly line 52 to the end of the pull line 60. During use, the distal end 61 of the pull line 60 is tied to the quick connector 62. The end of the existing fly line 50 or new fly line 52 is extended through the main opening 63 of the quick connector 62. The fly line is then pulled parallel to the longitudinal axis of the quick connector 62 so that the fly line is positioned inside the slot 67 to hold the fly line on the quick connector 62. In the preferred embodiment, the quick connector 62 is less than ⅛ inch in width so that it may freely pass through the eyelets 66, 66', 66".

Formed on the back surface of the main housing 21 are two parallel, U-shaped bracket members 80, 82 designed to receive a strap member 85 with opposite hook and loop interconnecting surfaces 87, 88, respectively. The bracket members 80, 82 are aligned on the back surface perpendicular to the line guide 37 so that the line guide 37 faces forward when the strap member 85 is wrapped around the fly rod as shown in FIG. 1. During use, the strap member 85 is extended through the bracket members 80, 82 and looped over the fly rod 65 as shown in FIG. 1, and the hook and loop connectors 87, 88 are connected together to securely hold the apparatus 10 in place on the fly rod 65.

During installation, the temporary reel 20 is first selected and the strap member 85 is inserted through the bracket members 80, 82 and around the fly rod 65 approximately twelve inches in front of the main fly reel 70. When the existing fly line 50 is to be replaced, the existing fly line 50 is rewound on the main fly reel 70 until the distal end 61 of the existing fly line 50 is located adjacent to the temporary reel 20. The distal end 61 of the existing fly line 50 is then connected to the quick connector 62.

The existing fly line 50 is then rewound on the main fly reel 70 until the quick connector 62 is pulled through the first eyelet 66'. The distal end 61 of the existing fly line 50 is then disconnected from the quick connector 62. The spool 72 for the existing fly line 50 is then removed from the main fly reel 70 and replaced with the spool 74 for the new fly line 52. The distal end 53 of the new fly line 52 is then connected to the quick connector 62. The pull line 60 is then rewound on the temporary reel 20 until the quick connector 62 is pulled through the distal eyelet 66" and back towards the temporary reel 20 until it is adjacent thereto. The distal end 53 of the new fly line 52 is then disconnected from the quick connector 62.

Also disclosed herein is a method of exchanging fishing lines including the following steps:

a. selecting a fishing line exchange apparatus 10;
b. attaching said fishing line exchange apparatus 10 to a fishing rod 65;
c. connecting the end of the pull line 60 to the existing fly line 50;
d. rewinding the existing fly line 50 on to the main fly reel 70 until the distal end 61 of the pull line 60 is pulled through the eyelet 66' closest to the main fly reel 70;
e. detaching the end of the fly line 50 from the end 61 of the pull line 60;
f. replacing the fly line 50 in the main fly reel 70 with a new fly line 52;
g. attaching the end 53 of the fly line 52 to the end 61 of the pull line 60 using the quick connector 62;
h. pulling the pull line 60 until the end 53 of the new fly line 52 is pulled through the farthest eyelet 66"; and
i. disconnecting the end 53 of the new fly line 52 from the end 61 of the pull line 60.

In compliance with the statute, the invention described herein has been described in language more or less specific as to structural features. It should be understood, however, that the invention is not limited to the specific features shown, since the means and construction shown comprise only the preferred embodiments for putting the invention into effect. The invention is therefore claimed in any of its forms or modifications within the legitimate and valid scope of the amended claims, appropriately interpreted in accordance with the doctrine of equivalents.

I claim:

1. A fly line exchange apparatus for exchanging a spool of fly line in a fishing reel, comprising:
   a. a temporary reel for housing a rotating spool element;
   b. a strap for attaching said temporary reel to a fishing rod;
   c. a spool element disposed inside said temporary reel;
   d. a pull line wound on said spool element, said pull line having a distal end that extends outside said temporary reel; and;
   e. a quick connector comprising an oval-shaped ring that attaches to said distal end of said pull line, said ring including a partially extending slot formed on an inside surface that slidingly receives and attaches to the distal end of a fly line in a fishing reel, said quick connector being sufficient in size to travel freely through eyelets on a fishing rod.

2. The fly line exchange apparatus, as recited in claim 1, wherein said temporary reel includes a cylindrical-shaped main housing with a main opening capable of receiving said spool element and allowing said spool element to rotate therein to wind thereon and unwind said pull line from said spool element.

3. The fly line exchange apparatus, as recited in claim 2, wherein said spool element includes a circular front plate and a circular back plate spaced apart and capable of being inserted into said main housing.

4. The fly line exchange apparatus as recited in claim 1, further including a replacement spool of fly line that replaces an existing spool of fly line in said main fishing reel.

5. A fly line exchange kit for exchanging an existing spool of fly line in a fly fishing reel, comprising:
   a. a temporary reel;
   b. a strap for attaching said temporary reel to a fishing rod having a main fishing reel;
   c. a spool element attached to said temporary reel;
   d. a pull line wound on said spool element, said pull line having a free distal end and being between 10 to 25 feet in length;
   e. a quick connector comprising a ring with a partially extending slot formed on an inside surface that slidingly receives and attaches to the end of a fly line, said ring being sufficiently small to travel freely through eyelets on a fishing rod; and,
   f. at least one replacement spool of fly line that replaces an existing spool of fly line in the main fishing reel.

6. The fly line exchange apparatus, as recited in claim 5, wherein said temporary reel includes a cylindrical-shaped main housing with a main opening capable of receiving said spool element, said spool element capable of rotating inside said main housing to wind and unwind said pull line thereon.

7. The fly line exchange apparatus, as recited in claim 6, wherein said spool element includes a circular front plate and a circular back plate spaced apart and capable of being inserted into said main housing.

8. A method of exchanging fly fishing line on a fishing rod having a main reel housing with an existing fly line, a plurality of eyelets positioned longitudinally along the fishing rod, said method including the following steps:

a. selecting a fishing line exchange apparatus having a temporary reel with a pull line wound thereon with a strap attached thereto for attaching said temporary reel to a fishing rod, and a quick connector comprising a ring with a partially extending slot formed on an inside surface that slidingly receives and attaches to the distal end of the fly line, said quick connector being connected to the distal end of said pull line at a location opposite said slot, said quick connector able to travel freely through the eyelets on a fishing rod;
   b. attaching said temporary reel to a fishing rod;
   c. connecting said quick connector to an existing fly line;
   d. rewinding the existing fly line onto the main reel housing until said quick connector is pulled through the eyelet closest to the main reel housing;
   e. detaching said quick connector from the end of the existing fly line;
   f. selecting a replacement fly line;
   g. replacing the fly line in the main reel with a replacement fly line;
   h. attaching the distal end of the replacement fly line to said quick connector;
   i. rewinding the pull line onto said temporary reel until the said quick connector is pulled through the last eyelet on said fishing rod; and,
   j disconnecting said quick connector from the distal end of said replacement fly line.

* * * * *